(12) United States Patent
Aggarwal et al.

(10) Patent No.: US 8,396,855 B2
(45) Date of Patent: Mar. 12, 2013

(54) IDENTIFYING COMMUNITIES IN AN INFORMATION NETWORK

(75) Inventors: Charu C. Aggarwal, Yorktown Heights, NY (US); Rajesh R. Bordawekar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 12/790,128

(22) Filed: May 28, 2010

(65) Prior Publication Data

US 2011/0295832 A1    Dec. 1, 2011

(51) Int. Cl.
*G06F 7/00* (2006.01)
(52) U.S. Cl. ......... 707/709; 709/213; 709/220; 709/223
(58) Field of Classification Search ................. 707/709; 709/213, 220, 223
See application file for complete search history.

(56) References Cited

U.S. PATENT DOCUMENTS

| | | | |
|---|---|---|---|
| 5,950,189 A * | 9/1999 | Cohen et al. | 1/1 |
| 6,981,037 B1 * | 12/2005 | Srikant et al. | 709/223 |
| 7,028,029 B2 * | 4/2006 | Kamvar et al. | 1/1 |
| 7,478,078 B2 * | 1/2009 | Lunt et al. | 1/1 |
| 7,958,120 B2 * | 6/2011 | Muntz et al. | 707/736 |
| 2003/0063072 A1 * | 4/2003 | Brandenberg et al. | 345/173 |
| 2005/0243736 A1 * | 11/2005 | Faloutsos et al. | 370/254 |
| 2006/0122998 A1 * | 6/2006 | Bar-Yossef et al. | 707/5 |
| 2008/0270549 A1 * | 10/2008 | Chellapilla et al. | 709/206 |
| 2009/0070490 A1 * | 3/2009 | Dozier et al. | 709/248 |
| 2011/0167115 A1 * | 7/2011 | Gilbert et al. | 709/204 |

OTHER PUBLICATIONS

Abello et al. Massive quasiclique detection. In LATIN, 2002.
Aggarwal et al. Managing and Mining Graph Data. Springer, 2009.
Clauset et al. Finding community structure in very large networks. In Phys. Rev. E 70, 066111, 2004.
Cohen et al. Finding interesting associations without support pruning. IEEE TKDE, 13(1), 2001.
Faloutsos et al. On power law relationships of the internet topology. In SIGCOMM, 1999.
Gibson et al. Discovering large dense subgraphs in massive graphs. In VLDB, 2005.
Gionis et al. Geometric and combinatorial tiles in 0-1 data. In PKDD, 2004.
Kumar et al. Trawling the web for emerging cyber-communities. In WWW, 1999.
Leskovec et al. Statistical properties of community structure in large social and information networks. In WWW, 2008.
Pei et al. On mining cross-graph quasicliques. In ACM KDD Conference, 2005.
Satulouri et al. Scalable graph clustering using stochastic flows: Applications to community discovery. In KDD Conference, 2009.
Tang et al. Graph mining applications to social network analysis. In Managing and Mining Graph Data, Ed. Charu Aggarwal, Haixun Wang, 2010.

(Continued)

*Primary Examiner* — Cheyne Ly
(74) *Attorney, Agent, or Firm* — Ryan, Mason & Lewis, LLP

(57) ABSTRACT

Techniques for identifying one or more communities in an information network are provided. The techniques include collecting one or more nodes and one or more edges from an information network, performing a random walk on the one or more nodes to produce a sequence of one or more nodes, creating a sequence database from one or more sequences produced via random walk, and mining the sequence database to determine one or more patterns in the network, wherein the one or more patterns identify one or more communities in the information network.

20 Claims, 5 Drawing Sheets

OTHER PUBLICATIONS

Zeng et al. Out-of-core coherent closed quasi-clique mining from large dense graph databases. In ACM Transactions on Database Systems, vol. 31(2), 2007.

Agrawal et al. Fast Algorithms for mining association rules in large databases. vldb conference, 1994.

* cited by examiner

IDENTIFYING COMMUNITIES IN AN INFORMATION NETWORK

FIELD OF THE INVENTION

Embodiments of the invention generally relate to information technology, and, more particularly, to community detection in network analysis.

BACKGROUND OF THE INVENTION

The problem of community detection is widely known in the context of social and information network analysis. Most existing approaches for community detection determine the dense graphs in the underlying network. As used herein, a community may, by way of example, be considered a group of nodes densely connected by edges. Existing approaches for community detection in graphs can include, for example, node clustering algorithms for graphs with the use of shingling techniques, matrix co-clustering techniques, and tile determination in matrices. The problem of community detection in social networks has also become increasingly prominent because of the increasing importance of social networking applications. However, none of the techniques are designed for the problem of determination of sparse communities.

SUMMARY OF THE INVENTION

Principles and embodiments of the invention provide techniques for identifying communities in an information network. An exemplary method (which may be computer-implemented) for identifying one or more communities in an information network, according to one aspect of the invention, can include steps of collecting one or more nodes and one or more edges from an information network, performing a random walk on the one or more nodes to produce a sequence of one or more nodes, creating a sequence database from one or more sequences produced via random walk, and mining the sequence database to determine one or more patterns in the network, wherein the one or more patterns identify one or more communities in the information network.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
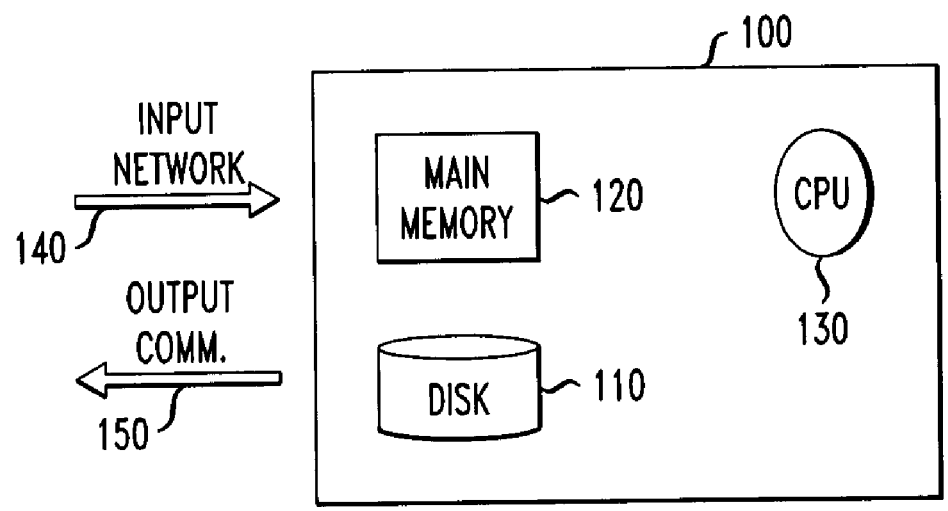
FIG. 1 is a diagram illustrating example architecture according to an embodiment of the present invention.
Figure 1:
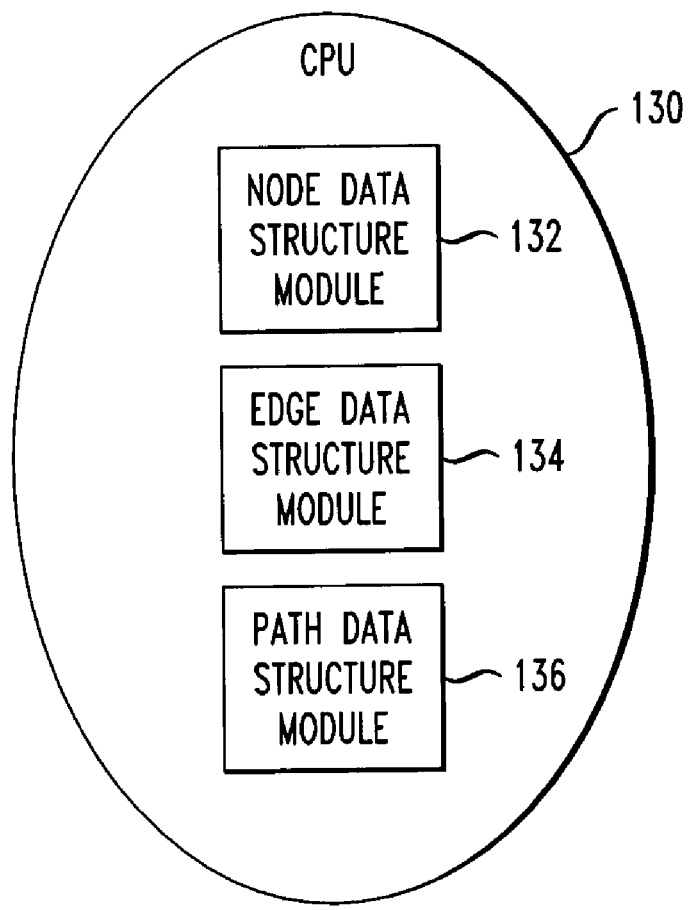

Principles of the invention include identifying sparse communities in an information network. As detailed herein, one or more embodiments of the invention include determining hidden or surprising communities in massive social networks (via, for example, a random walk approach). Such communities can be defined as those highly connected regions of a graph which use a relatively small number of edges compared to their connectivity level. Many forms of hidden communities (such as, for example, adversarial networks, newly forming communities, globally planned communities, etc.) may be aligned with this criterion.

By way of example, a social network can be represented as a graph, in which nodes represent users and links represent the connections between users. Community detection is closely related to network clustering, which includes determining the dense regions in the underlying network. Such dense regions are related to the challenge of community detection in massive networks because most communities typically have a high level of interaction between the participants.

Communities can be, for example, defined on the basis of connectivity rather than edge-density. Most dense graphs also tend to be highly connected; however there are quite a few cases where this is not true, especially when the communities are constructed as a result of careful global planning. These, also, can be the most interesting cases in which the communities are hidden, and cannot be easily determined with the use of dense graph determination algorithms. Examples of such scenarios can include community determination in adversarial networks, early determination of communities in a network, and globally planned communities.

One possible strategy might include directly designing a connectivity-based approach to determine the communities in an underlying network. However, this approach may also not be very effective because highly connected regions also tend to be dense; therefore such an algorithm would be overwhelmed with an output of dense communities which are not very interesting. Techniques are needed to provide insights into the highly connected but sparse regions of the network. Such regions can be difficult to find because the problem is equivalent to that of finding highly connected structures that are masked by many dense regions of the network. Furthermore, the massive size of social networks makes the task even more challenging from a combinatorial perspective.

As such, one or more embodiments of the invention include determining sparse communities in an information network.

In many practical applications, such sparse communities are masked by the clusters in the information network. As noted, sparse communities can be defined as those which have high connectivity at the expense of a small number of edges.

One or more embodiments of the invention examine the connection between hidden community determination and the concept of expander graphs, and provide a disk-sensitive algorithm for determination of hidden communities in massive graphs. Expander graphs are often used in the design of a large communication network in order to create robust and highly connected networks, which are not dense enough to be too costly to design. A similar concept is relevant in the case of community detection, except that the search is for determination of vertex-subset induced sub-graphs, which satisfy expander properties on a pre-defined network.

Typical social networks are very large and there can be an exponential number of vertex subsets which satisfy these properties. Therefore, it is prudent to determine maximal expander graphs in order to further reduce both the output size and the complexity of processing. It is also advantageous to be able to design disk-resident algorithms because the network data may be too large to hold in main memory at a given time. This is particularly challenging for an inherently combinatorial problem such as expander graph discovery, in which the edge access order tends to be random. Such random edge accesses may lead to challenges in algorithmic design, especially when the input data is disk-resident. Accordingly, one or more embodiments of the invention provide an efficient algorithm for the determination of such hidden communities with the use of carefully designed disk-sensitive techniques. Such an approach is more insightful than existing techniques of determining dense sub-graphs, and also retains a high level of efficiency over massive networks.

FIG. 1 is a diagram illustrating example architecture according to an embodiment of the present invention. By way of illustration, FIG. 1 depicts computations being performed on a server 100 that includes a disk 110, a main memory 120 and a central processing unit (CPU) 130. As depicted in FIG. 1, the input 140 is a network with nodes and edges, and the output 150 is the set of communities that are determined by the mining process. Additionally, the input can be constructed, for example, using a crawling approach such as the one detailed in FIG. 3.

Further, as detailed herein, one or more embodiments of the invention include algorithms, used for the mining process, that are executed on a CPU (for example, CPU 130 in FIG. 1). As also depicted in FIG. 1, CPU 130 can include distinct software modules such as a node data structure module 132, an edge data structure module 134, and a path data structure module 136. All of the data for the network (for example, as crawled via the process depicted in FIG. 3) are stored on a disk (for example, disk 110 in FIG. 1). Also, a main memory (for example, main memory 120 in FIG. 1) can be used for intermediate computations.

Figure 2:
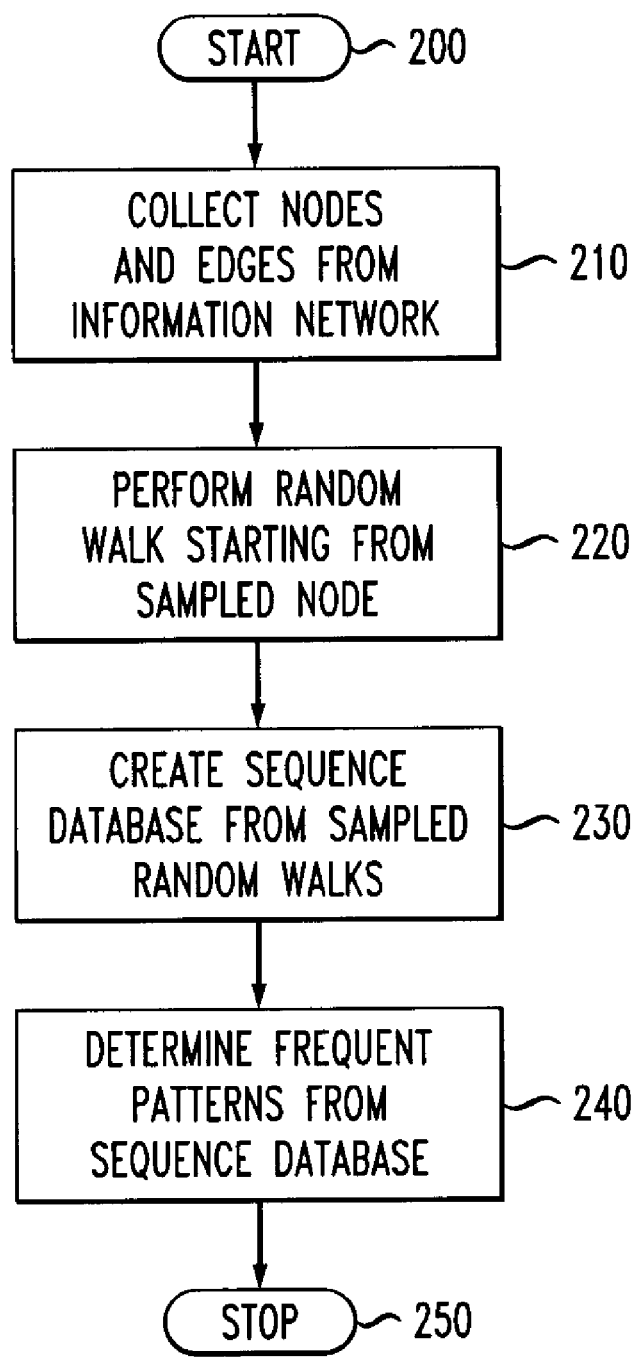
FIG. 2 is a flow diagram illustrating techniques for determining sparse communities in an information network, according to an embodiment of the present invention.

FIG. 2 is a flow diagram illustrating techniques for determining sparse communities in an information network, according to an embodiment of the present invention. Step 200 includes commencing the process. Step 210 includes collecting the nodes and edges from the information network. This step is described in additional detail in connection with FIG. 3. Step 220 includes performing a random walk starting from the sampled node. As used herein, a random walk is a process by which a given node is chosen as a starting point and subsequent nodes are chosen at random for the traversal process. This random walk provides a sample of the sequence of nodes which form the output of the walk, and can be used to create a sequence database. Step 220 is additionally described in connection with FIG. 4.

Step 230 includes creating a sequence database from sampled random walks by adding sequences to the database. Step 240 includes mining the sequence database to determine the relevant patterns in the network. This step is additionally described in detail in connection with FIG. 5. Also, step 250 includes stopping the process.

Figure 3:
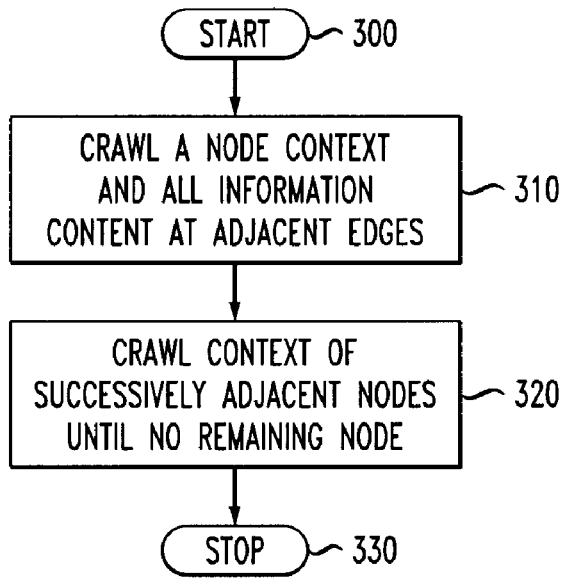
FIG. 3 is a flow diagram illustrating techniques for collecting the nodes and edges of an information network, according to an embodiment of the present invention.

FIG. 3 is a flow diagram illustrating techniques for collecting the nodes and edges of an information network, according to an embodiment of the present invention. The steps depicted in FIG. 3 can also be considered a detailed description of step 210 of FIG. 2.

By way of illustration, FIG. 3 depicts the process of crawling the structure of the information process. The crawling process can refer, for example, to the technique of accessing and storing the structure of the information network by downloading it from the internet. In order to successfully perform this crawling, the linkage structure plays a critical role. One or more embodiments of the invention include recursively following the links and crawl the nodes in the information network.

As depicted in FIG. 3, step 300 includes commencing the process. Step 310 crawling a node and all of its adjacent edges. Step 320 includes crawling all of the nodes connected to these adjacent edges. In one or more embodiments of the invention, this process can be repeated recursively until no node remains to be crawled in the information network. Further, step 330 includes stopping the process.

Figure 4:
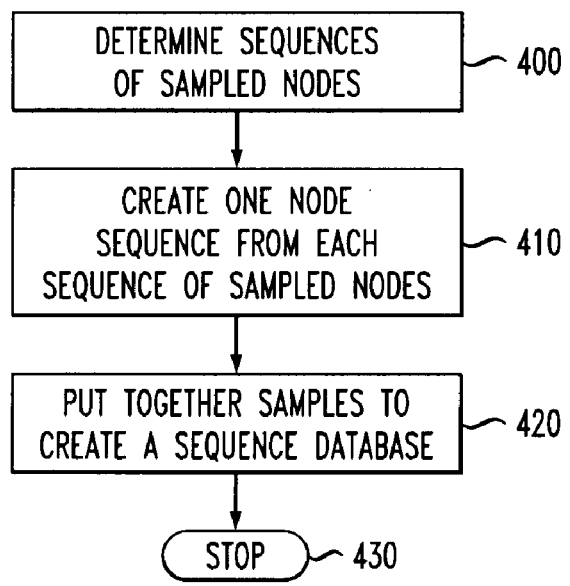
FIG. 4 is a flow diagram illustrating techniques for creating a sequence database from sampled nodes, according to an embodiment of the present invention.

FIG. 4 is a flow diagram illustrating techniques for creating a sequence database from sampled nodes, according to an embodiment of the present invention. The steps depicted in FIG. 4 can also be considered a detailed description of step 220 of FIG. 2. By way of illustration, FIG. 4 depicts the process of creating a sequence database from the information network.

Figure 5:
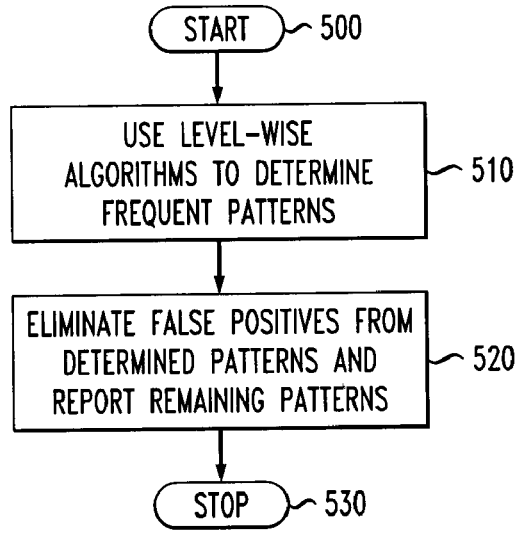
FIG. 5 is a flow diagram illustrating techniques for mining a sequence database, according to an embodiment of the present invention.

A sequence database provides a useful intermediate representation which can be mined in order to determine relevant communities, as detailed herein (for example, in connection with FIG. 5). The sequences can include samples of random walks in the crawled network. The sampling can be performed, for example, by picking a node at random, and following other nodes in random order.

As such, step 400 includes determining sequences of sampled nodes. Step 410 includes randomly sampling a node and traversing the adjacent nodes in random order. One or more embodiments of the invention can include creating one sequence from the sequence database by using this order of the nodes. Additionally, this step can be repeated to create a database containing multiple samples, such as depicted in step 420. These samples can be used for the mining process. Further, step 430 includes stopping the process.

FIG. 5 is a flow diagram illustrating techniques for mining a sequence database, according to an embodiment of the present invention. The steps depicted in FIG. 5 can also be considered a detailed description of step 230 of FIG. 2. By way of illustration, FIG. 5 depicts the process of mining communities from a sequence database that has been constructed.

Step 500 includes commencing the process. Step 510 includes using a pattern mining algorithm (for example, a frequent pattern mining algorithm) to mine frequent patterns from the sequence database. In one or more embodiments of the invention, this step provides a list of candidate communities. Also, by way of example, the random walk approach to creating the sequence database ensures that the frequent patterns in the sequence database are typically patterns which have high conductance. High conductance patterns are defined by sets of nodes that have very high connectivity at the cost of a small number of edges. For instance, conductance can be defined as the ratio of the minimum number of edges between any partition of the node set to the total number of edges in the node set.

However, some of these patterns can be false positives, and such false positives need to be checked against the original database (that is, the information/crawled network) and eliminated. Therefore, one or more embodiments of the invention can include reverting back to the original database and determining if the mined patterns satisfy the conductance constraints. By way of example, one or more embodiments of the invention can include determining if the conductance is above a minimum pre-defined user threshold. Those patterns which do not satisfy the conductance constraint are eliminated. The above, as depicted in FIG. 5, is achieved via step 520, and the remaining patterns are reported as the relevant communities. Further, step 530 includes stopping the process.

As described herein, one or more embodiments of the invention include determining sparse communities in information networks. By way of example, a random walk scheme can be utilized to determine the most relevant patterns in the data, and these random walks can be used to create a sequence database which is subsequently mined in order to determine the frequent patterns. These, as detailed herein, can be considered the sparse communities in the information network. The use of a random walk approach ensures the ability to determine the communities that have a high level of mixing.

Additionally, the determination of such communities can be useful for a variety of applications in which the true communities are masked by other more dense communities in the network. For example, communities which are created in adversarial settings can have these properties, that is, a community formed that is highly connected by with a small number of edges. Such a community has small conductance by definition.

Figure 6:
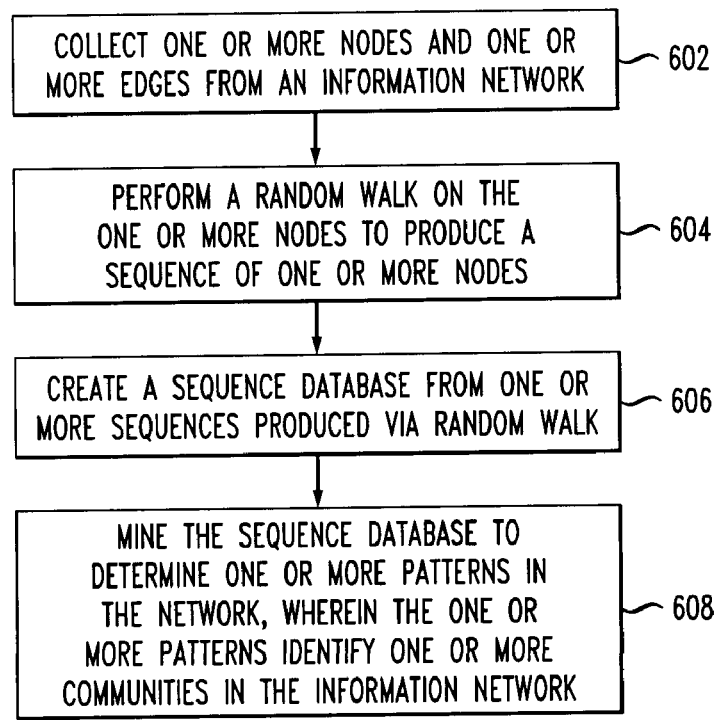
FIG. 6 is a flow diagram illustrating techniques for identifying one or more communities in an information network, according to an embodiment of the invention.

FIG. 6 is a flow diagram illustrating techniques for identifying one or more communities in an information network, according to an embodiment of the present invention. Step 602 includes collecting one or more nodes and one or more edges from an information network. Collecting nodes and edges from an information network can include crawling a node and each adjacent edge corresponding to the node, as well as, for example, crawling each of one or more nodes connected to each adjacent edge corresponding to the node. Also, in one or more embodiments of the invention, these steps can be repeated recursively until no node remains to be crawled in the information network.

Step 604 includes performing a random walk on the one or more nodes to produce a sequence of one or more nodes. Performing a random walk on the nodes can include determining one or more sequences of one or more sampled nodes, and randomly sampling a node and traversing one or more adjacent nodes in random order. A sequence of nodes can be created using this random order of the nodes.

Step 606 includes creating a sequence database from one or more sequences produced via random walk. Step 608 includes mining the sequence database to determine one or more patterns in the network, wherein the one or more patterns identify one or more communities in the information network. Mining the sequence database to determine patterns in the network can include using a pattern mining algorithm (for example, a frequent pattern mining algorithm) to mine frequent patterns from the sequence database.

Additionally, one or more embodiments of the invention can include checking one or more of the one or more patterns against the information network to eliminate one or more false positive patterns. Checking the patterns against the information network to eliminate false positive patterns can include determining if the mined patterns satisfy one or more conductance constraints of the information network, eliminating each pattern that does not satisfy the conductance constraints, and reporting each remaining pattern as a relevant community.

The techniques depicted in FIG. 6 can also, as described herein, include providing a system, wherein the system includes distinct software modules, each of the distinct software modules being embodied on a tangible computer-readable recordable storage module, an edge data structure module, and a path data structure module executing on a hardware processor. Each node data structure within the node data structure module includes node data about a node with one or more node attributes. Each edge data structure within the edge data structure module defines one or more edge relationships between a pair of nodes. Also, each path data structure within the path data structure module includes path data about one or more paths, wherein a path includes two or more nodes related by one or more edge relationships.

One or more embodiments of the invention can additionally include identifying (for example, via a conductivity process) a subset of selected nodes that are connected to a number of paths through a number of edge relationships, wherein the number of paths is greater than a path threshold and the number of edges is less than an edge threshold. Further, one or more embodiments of the invention can maximize the number of paths while minimizing the number of edges, and/or maximize the number of paths while minimizing an edge weight, wherein the edge weight defines a significance of a link (such as, for example, the length of the message, data transfer, or the duration of the friendship). By way of example, a link in a social network can include a friendship relationship, and a link on the web can be a hyperlink.

In one or more embodiments of the invention, the subset of selected nodes can be connected, for example, with a number of edges below a minimum edge threshold, or with a cost below a minimum threshold. Additionally, the node attributes can include, by way of example, a node identity in addition to one or more additional attributes, wherein additional attributes can include temporal information about creation time, information about a social network, in formation about a telephone network, information about a computer network, etc. Also, edge relationships between a pair of nodes can include, for example, a friendship, a message, a hyperlink, a data transfer, etc.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 7:
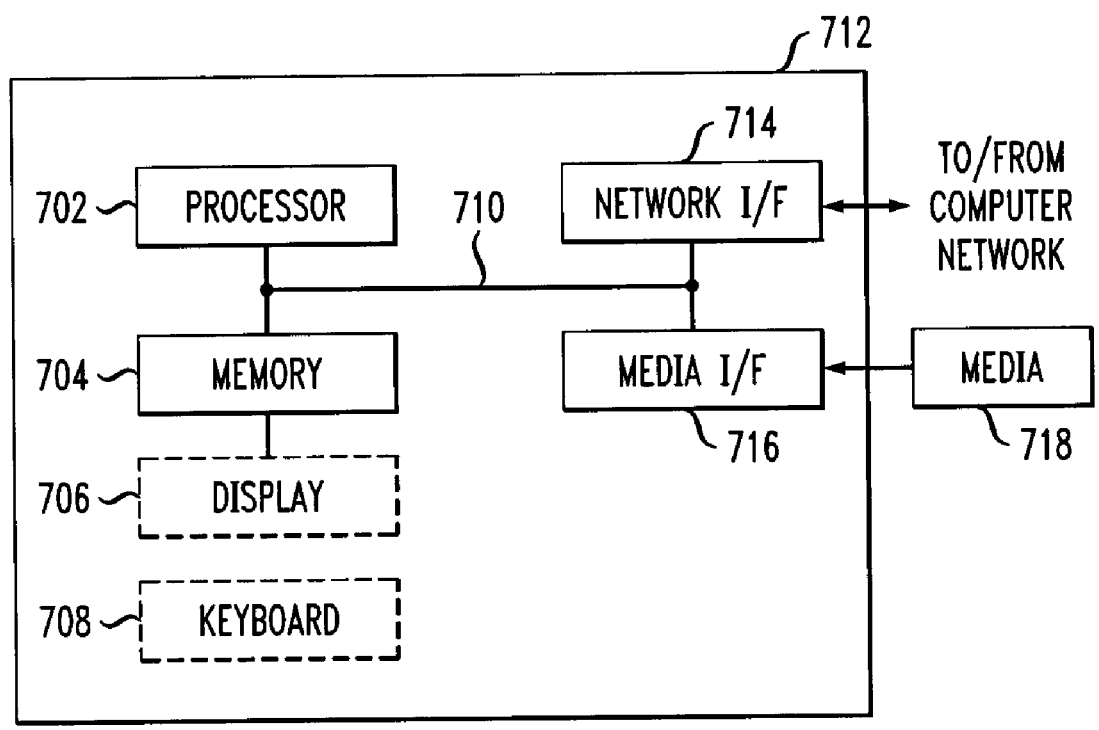
FIG. 7 is a system diagram of an exemplary computer system on which at least one embodiment of the invention can be implemented.

One or more embodiments can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 702. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, enabling determination of hidden communities in massive graphs.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method executed by a processor for identifying one or more communities in a social network, wherein the method comprises:

collecting one or more nodes and one or more edges from a social network, wherein the one or more nodes contain node attributes including node identity, temporal information about creation time, and information about the social network, and wherein the one or more edges define edge relationships between pairs of nodes including a friendship, a message, a hyperlink and a data transfer;

performing a random walk on the one or more nodes to produce a sequence of one or more nodes;

creating a sequence database from one or more sequences produced via random walk;

mining the sequence database to determine one or more patterns in the social network, wherein the one or more patterns identify one or more communities in the social network; and checking one or more of the one or more patterns against the social network to eliminate one or more false positive patterns by:
  determining if the one or more patterns satisfy one or more conductance constraints of the social network;
  eliminating each pattern that does not satisfy the one or more conductance constraints; and
  reporting each remaining pattern as a relevant community.

2. The method of claim 1, wherein collecting one or more nodes and one or more edges from the social network comprises crawling a node and each adjacent edge corresponding to the node.

3. The method of claim 2, further comprising crawling each of one or more nodes connected to each adjacent edge corresponding to the node.

4. The method of claim 3, further comprising repeating the steps of claims 2 and 3 recursively until no node remains to be crawled in the social network.

5. The method of claim 1, wherein performing a random walk on the one or more nodes comprises:
  determining one or more sequences of one or more sampled nodes; and
  randomly sampling a node and traversing one or more adjacent nodes in random order.

6. The method of claim 5, further comprising creating a sequence of nodes using the random order of the nodes.

7. The method of claim 1, wherein mining the sequence database to determine one or more patterns in the network comprises using a pattern mining algorithm to mine one or more frequent patterns from the sequence database.

8. The method of claim 1, further comprising:
  defining one or more edge relationships between a pair of nodes, wherein a path comprises two or more nodes related by one or more edge relationships.

9. The method of claim 8, further comprising identifying a subset of selected nodes that are connected to a number of paths through a number of edge relationships, wherein the number of paths is greater than a path threshold and the number of edges is less than an edge threshold.

10. The method of claim 9, further comprising maximizing the number of paths and minimizing the number of edges.

11. The method of claim 9, further comprising maximizing the number of paths and minimizing an edge weight, wherein the edge weight defines a significance of a link.

12. The method of claim 9, wherein the subset of selected nodes is connected with a number of edges below a minimum edge threshold.

13. The method of claim 9, wherein the subset of selected nodes is connected with a cost below a minimum threshold.

14. A non-transitory computer readable recordable storage medium program including a computer product comprising computer useable program code for identifying one or more communities in a social network, the computer program product including:
  computer useable program code for collecting one or more nodes and one or more edges from a social network, wherein the one or more nodes contain node attributes including node identity, temporal information about creation time, and information about the social network, and wherein the one or more edges define edge relationships between pairs of nodes including a friendship, a message, a hyperlink and a data transfer;
  computer useable program code for performing a random walk on the one or more nodes to produce a sequence of one or more nodes;
  computer useable program code for creating a sequence database from one or more sequences produced via random walk;
  computer useable program code for mining the sequence database to determine one or more patterns in the social network, wherein the one or more patterns identify one or more communities in the social network; and
  computer useable program code for checking one or more of the one or more patterns against the social network to eliminate one or more false positive patterns by:
    determining if the one or more patterns satisfy one or more conductance constraints of the social network;
    eliminating each pattern that does not satisfy the one or more conductance constraints; and
    reporting each remaining pattern as a relevant community.

15. The computer program product of claim 14, wherein the computer useable program code for collecting one or more nodes and one or more edges from the social network comprises computer useable program code for crawling a node and each adjacent edge corresponding to the node.

16. The computer program product of claim 15, further comprising computer useable program code for crawling each of one or more nodes connected to each adjacent edge corresponding to the node.

17. A system for identifying one or more communities in a social network, comprising:
  a memory; and
  at least one processor coupled to the memory and operative to:
    collect one or more nodes and one or more edges from a social network, wherein the one or more nodes contain node attributes including node identity, temporal information about creation time, and information about the social network, and wherein the one or more edges define edge relationships between pairs of nodes including a friendship, a message, a hyperlink and a data transfer;
    perform a random walk on the one or more nodes to produce a sequence of one or more nodes;
    create a sequence database from one or more sequences produced via random walk;
    mine the sequence database to determine one or more patterns in the social network, wherein the one or more patterns identify one or more communities in the social network; and
    check one or more of the one or more patterns against the social network to eliminate one or more false positive patterns by:
      determining if the one or more patterns satisfy one or more conductance constraints of the social network;
      eliminating each pattern that does not satisfy the one or more conductance constraints; and
      reporting each remaining pattern as a relevant community.

18. The system of claim 17, wherein the at least one processor coupled to the memory operative to collect one or more nodes and one or more edges from the social network is further operative to crawl a node and each adjacent edge corresponding to the node.

19. The system of claim 18, wherein the at least one processor coupled to the memory is further operative to crawl each of one or more nodes connected to each adjacent edge corresponding to the node.

20. An apparatus for identifying one or more communities in a social network, the apparatus comprising:
    means for collecting one or more nodes and one or more edges from a social network, wherein the one or more nodes contain node attributes including node identity, temporal information about creation time, and information about the social network, and wherein the one or more edges define edge relationships between pairs of nodes including a friendship, a message, a hyperlink and a data transfer, said means carried out via a distinct software module being embodied on a tangible computer-readable recordable storage medium executing on a hardware processor;
    means for performing a random walk on the one or more nodes to produce a sequence of one or more nodes, carried out via a distinct software module being embodied on a tangible computer-readable recordable storage medium executing on a hardware processor;
    means for creating a sequence database from one or more sequences produced via random walk, carried out via a distinct software module being embodied on a tangible computer-readable recordable storage medium executing on a hardware processor;
    means for mining the sequence database to determine one or more patterns in the social network, carried out via a distinct software module being embodied on a tangible computer-readable recordable storage medium executing on a hardware processor, wherein the one or more patterns identify one or more communities in the social network; and
    means for checking one or more of the one or more patterns against the social network to eliminate one or more false positive patterns by:
        determining if the one or more patterns satisfy one or more conductance constraints of the social network;
        eliminating each pattern that does not satisfy the one or more conductance constraints; and
        reporting each remaining pattern as a relevant community.

* * * * *